1
UNITED STATES PATENT OFFICE.

WILLIAM B. ROBESON, OF PORT HURON, MICHIGAN.

SURFACING COMPOSITION AND METHOD OF PRODUCING SAME.

1,405,941.      Specification of Letters Patent.      Patented Feb. 7, 1922.

No Drawing.      Application filed August 25, 1921. Serial No. 495,360.

*To all whom it may concern:*

Be it known that I, WILLIAM B. ROBESON, a citizen of the United States, and a resident of Port Huron, St. Clair County, Michigan, have invented certain new and useful Improvements in Surfacing Compositions and Methods of Producing Same, of which the following is a description.

My invention relates to surfacing compositions and more particularly to a coating or surfacing composition, preferably in the nature of a synthetic liquid slating, primarily intended for application to materials used in the building industry such as iron, steel, wood, concrete, stone and brick, but which is also adapted for coating other materials.

The principal object of my invention is to produce an improved surfacing composition of this character which will form a highly efficient protective coating for the materials to which it may be applied; and my invention includes the method of producing such improved composition as well as the composition itself.

My improved composition preferably comprises a novel mixture or combination of materials which may suitably be termed the base of the composition, preferably combined with a suitable thinning liquid, such as a neutral oil, and with a substance preferably including silicon such as that known as carbon silicon, though the latter may be omitted without detriment to the composition for certain uses thereof. The substance referred to herein as carbon silicon is carbide of silicon, and the form thereof which I preferably employ is the colloidal dust or powder formed as a by-product in making carborundum.

The base of my improved composition consists of a mixture of a suitable resin, such as a natural synthetic resin or gum produced from coal tar distillates and preferably that known as paracoumarone resin, any one or more of a number of hydro-carbon waxes, and any one or more of the pitches derived from the distillation of mixtures of fatty acids and glycerine or from the various processes, such as the Twitchell process, the sulphuric process and the catalytical processes, used in separating vegetable and animal fats into glycerine and fatty acids. The hydro-carbon waxes which I prefer to employ and find most suitable are Montan wax and ozokerite, while of the various pitches derived from the treatment of vegetable and animal oils I prefer to use wool pitch, stearine pitch and palm oil pitch.

In forming the base for my surfacing composition, the resin, one or more of the hydro-carbon waxes, but preferably either one or both of the materials known as Montan wax and ozokerite, and one or more of the pitches, but preferably any one or more of the group of materials consisting of wool pitch, stearine pitch and palm oil pitch, are dissolved together in a suitable receptacle by the application of heat until thoroughly liquid. The specific ingredients used in forming the base of my composition, as well as the proportions in which they are combined, are subject to great variation and depend upon the uses for which the finished product is designed and the conditions under which it is to be used. For example, in certain cases it is preferable to employ only one or the other of the hydro-carbon waxes specifically mentioned, viz: Montan wax and ozokerite; while in other cases it is desirable to employ both Montan wax and ozokerite. This is also true with reference to the pitches above mentioned. Also the various ingredients from which the base of my composition is formed, may be combined in equal or unequal proportions of each as occasion demands.

The product comprising the base of my composition and formed as above described, is now mixed with a suitable thinning liquid such as a neutral oil, but preferably with a neutral coal tar oil such as coal tar naphtha or benzol, and in some cases preferably with petroleum naphtha. While the proportions of the melted mixture and thinning liquid may be considerably varied, I prefer to employ substantially three parts by volume of the thinning oil to one part by volume of the mixture. The resulting product may be colored as desired by the addition of suitable coloring pigments, and for certain uses of the finished composition a substance containing silicon, such as carbon silicon, is added to or mixed with such product.

The surfacing composition above described constitutes what I term a "liquid slating," and may be readily applied, as by brushing, to the surfaces of the various materials for which it is designed to be used. After it has been applied to any surface it soon dries to form a coating therefor in the nature of a flexible, argillaceous shale or synthetic slating, which is waterproof and weatherproof and unaffected by acids and alkalis. When the composition is applied to wooden materials, such as shingles, it penetrates into the wood and has a tendency to petrify it; when applied to brick it penetrates the same and produces a glazed surface thereon similar to that produced by vitrification; when applied to concrete and stone it renders the same impervious to moisture; and when applied to iron, steel and other metals it forms a flexible, waterproof coating therefor and prevents such metals from corroding.

It is to be distinctly understood that the specific ingredients of my improved surfacing composition and also the proportions in which the ingredients are combined, are subject to wide variation, without departure from the spirit of the invention and the scope of the appended claims.

Having now fully described my invention, what I claim as new and desire to protect by Letters Patent is as follows:

1. A liquid slating composition comprising a mixture of a resin, a hydro-carbon wax, and pitch, said mixture being combined with a thinning oil and a substance including silicon.

2. A liquid slating composition comprising a mixture of a synthetic coal tar resin, a hydro-carbon wax, and pitch, said mixture being combined with a neutral thinning oil and carbon silicon.

3. A liquid slating composition comprising a mixture of paracoumarone resin, a hydro-carbon wax, and pitch, said mixture being combined with a thinning oil and a substance including silicon.

4. A liquid slating composition comprising a mixture of a resin, Montan wax, and pitch, said mixture being combined with a thinning oil and a substance including silicon.

5. A liquid slating composition comprising a mixture of paracoumarone resin, Montan wax, and pitch, said mixture being combined with a thinning oil and a substance including silicon.

6. A liquid slating composition comprising a mixture of a resin, a hydro-carbon wax, and pitch, said mixture being combined with a neutral naphtha and a substance including silicon.

7. A liquid slating composition comprising a mixture of a resin, a hydro-carbon wax, and pitch, said mixture being combined with a neutral coal tar oil and a substance including silicon.

8. A surfacing composition comprising a mixture of a resin, a hydro-carbon wax, and pitch, said mixture being combined with a thinning oil.

9. A surfacing composition comprising a mixture of a synthetic coal tar resin, a hydro-carbon wax, and pitch, said mixture being combined with a neutral thinning oil.

10. A surfacing composition comprising a mixture of paracoumarone resin, a hydro-carbon wax, and pitch, said mixture being combined with a thinning oil.

11. A surfacing composition comprising a mixture of a resin, Montan wax, and pitch, said mixture being combined with a thinning oil.

12. A surfacing composition comprising a mixture of paracoumarone resin, Montan wax, and pitch, said mixture being combined with a thinning oil.

13. A surfacing composition comprising a mixture of a resin, a hydro-carbon wax, and pitch, said mixture being combined with a neutral naphtha.

14. A surfacing composition comprising a mixture of a resin, a hydro-carbon wax, and pitch, said mixture being combined with a neutral coal tar oil.

15. A liquid slating composition, comprising a mixture containing paracoumarone resin, Montan wax, ozokerite, wool pitch, stearine pitch and palm oil pitch, said mixture being combined with a thinning liquid and a substance including silicon.

16. A liquid slating composition, comprising a mixture containing paracoumarone resin, Montan wax, wool pitch, stearine pitch and palm oil pitch, said mixture being combined with a thinning liquid and a substance including silicon.

17. A liquid slating composition, comprising a mixture containing paracoumarone resin, Montan wax, ozokerite, wool pitch and stearine pitch, said mixture being combined with a thinning liquid and a substance including silicon.

18. A liquid slating composition, comprising a mixture containing paracoumarone resin, Montan wax, ozokerite and wool pitch, said mixture being combined with a thinning liquid and a substance including silicon.

19. A liquid slating composition comprising a mixture of a synthetic resin produced from coal tar distillates, a hydro-carbon wax, wool pitch, stearine pitch and palm oil pitch, said mixture being combined with a thinning liquid and a substance including silicon.

20. A liquid slating composition comprising a mixture of a synthetic resin produced from coal tar distillates, a hydro-carbon wax, wool pitch and stearine pitch, said mixture being combined with a thinning liquid and a substance including silicon.

21. A liquid slating composition comprising a mixture of a synthetic resin produced from coal tar distillates, a hydro-carbon wax and wool pitch, said mixture being combined with a thinning liquid and a substance including silicon.

22. A surfacing composition comprising a mixture of a synthetic resin produced from coal tar distillates, a hydro-carbon wax, wool pitch, stearine pitch and palm oil pitch, said mixture being combined with a thinning liquid.

23. A surfacing composition comprising a mixture of a synthetic resin produced from coal tar distillates, a hydro-carbon wax, wool pitch and stearine pitch, said mixture being combined with a thinning liquid.

24. A surfacing composition comprising a mixture of a synthetic resin produced from coal tar distillates, a hydro-carbon wax and wool pitch, said mixture being combined with a thinning liquid.

25. A base for a surfacing composition containing a synthetic resin produced from coal tar distillates, a hydro-carbon wax and a pitch.

26. A surfacing composition comprising a mixture containing a synthetic resin produced from coal tar distillates, a hydro-carbon wax and a pitch said mixture being combined with a thinning liquid.

27. A liquid slating composition comprising a mixture containing a synthetic resin produced from coal tar distillates, a hydro-carbon wax and a pitch said mixture being combined with a thinning liquid and a substance including silicon.

28. A surfacing composition comprising a mixture containing a synthetic resin produced from coal tar distillates, a hydro-carbon wax and at least one of the pitches obtained in separating vegetable and animal oils into glycerine and fatty acids, said mixture being combined with a coal tar oil.

29. A liquid slating composition comprising a mixture containing a synthetic resin produced from coal tar distillates, a hydro-carbon wax and a pitch said mixture being combined with a coal tar oil and a substance including silicon.

30. The process of producing a surfacing composition which consists in dissolving together by heat until liquid, a mixture of a synthetic resin produced from coal tar distillates, a hydro-carbon wax and a pitch and then thinning the melted mixture with a neutral oil.

31. The process of producing a liquid slating composition which consists in dissolving together by heat until liquid, a mixture of a synthetic resin produced from coal tar distillates, a hydro-carbon wax and a pitch and then thinning the melted mixture with a neutral oil and adding a substance including silicon thereto.

32. The process of producing a surfacing composition which consists in dissolving together by heat until liquid, a mixture of a synthetic resin produced from coal tar distillates, a hydro-carbon wax and a pitch and then thinning the melted mixture by adding thereto a neutral oil in the proportion of approximately 3 parts of the oil to one part of the mixture.

This specification signed this 20th day of August 1921.

WILLIAM B. ROBESON.